(12) United States Patent
Kajiura

(10) Patent No.: US 6,316,908 B2
(45) Date of Patent: Nov. 13, 2001

(54) BATTERY CHARGER WITH WIRING OPENING FOR CONDUCTING WIRE CONNECTION THERETHROUGH

(75) Inventor: Katsuyuki Kajiura, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/731,967

(22) Filed: Dec. 7, 2000

(30) Foreign Application Priority Data

Dec. 16, 1999 (JP) .................................................. 11-357263

(51) Int. Cl.[7] .................................................. H01M 10/46
(52) U.S. Cl. .............................................................. 320/104
(58) Field of Search .................................. 320/103, 104, 320/107, 108

(56) References Cited

U.S. PATENT DOCUMENTS 5,461,299    10/1995    Bruni .
6,127,799  * 10/2000    Krishnan ............................. 320/104

* cited by examiner

*Primary Examiner*—Edward H. Tso
(74) *Attorney, Agent, or Firm*—Woodstock Washburn Kurtz Mackiewicz & Norris LLP

(57) ABSTRACT

A charger includes a power source device having an outer casing constructed by housing, an upper housing and a side cover, which are formed of metal. Circuit boards and electric components are mounted to the lower housing. An indicator, a coupler resting case and a sensor are mounted on the upper housing. An opening is formed in the upper housing so that wires extending from the indicator and the sensor can be connected to wires extending from the circuit board through the opening of the upper housing, after the upper housing is placed on the lower housing. The opening is closed by a cover and is electromagnetically sealed.

11 Claims, 7 Drawing Sheets

BATTERY CHARGER WITH WIRING OPENING FOR CONDUCTING WIRE CONNECTION THERETHROUGH

BACKGROUND OF THE INVENTION

1. Field of the Invention

The present invention relates to a battery charger for a vehicle having a feeding coupler adapted to be coupled to a receiver in the vehicle for charging the battery provided on the vehicle such as an electric automobile or the like.

2. Description of the Related Art

In a charger for a vehicle, charging is performed by coupling a feeding coupler connected via a cable to a power source device (a power supply device) to a receiver (a receiving charging port) provided on a vehicle. Conventionally, an inductive system (an electromagnetic system induction) charger and a conductive system using different charging methods, are known.

For example, there has been proposed a charger for an inductive system as shown in FIG. 7.

The charger 71 comprises a power source device (a power supply device) 72 and a feeding coupler 74 attached to a distal end of a cable 73 extending from the power source device 72. The power source device 72 converts an alternating current supplied from a commercial alternating current power source into a charging alternating current (a predetermined frequency, a predetermined voltage) and outputs the alternating current so converted to the cable 73. A primary coil is built in the feeding coupler 74, and when the feeding coupler 74 is inserted in a receiver in the vehicle, an alternating current flows through the primary coil, and then current is induced in a secondary coil in the receiver under the action of electromagnetic induction, whereby charging is done.

A housing (outer casing) 75 of the power source device 72 is made of metal and comprises a base 76 and a bottomed tubular upper housing 77. Various electric circuit components for power and control systems (for example, a circuit board)(not shown) are mounted on the base 76. On the other hand, an indicator 78 and a coupler rest portion 79 where the feeding coupler 74 is inserted for rest are provided on the upper housing 77, and the indicator 78 is electrically connected to the electric circuit component, attached to the base 76, via wiring. A communication device is built in the feeding coupler 74 for communication with the receiver on the electric automobile to obtain information on the residual capacity of the battery when the coupler 74 is connected to the receiver on the vehicle. The communication device is controlled so as to be powered in a state in which the feeding coupler 74 is removed from the rest portion 79, and there is provided a sensor 80 for detecting the insertion or removal of the feeding coupler 74 into or from the rest portion 79. The sensor 80 is conventionally attached to the inner surface of the housing 75 for detecting the magnetism of a magnet located at a predetermined position in the feeding coupler 74.

The reason why the indicator 78 and the sensor 80 are mounted on the internal surface of the upper housing 77 is because the electric circuit components and electric apparatuses 78, 80 are completely covered with the metallic housing 75 for electromagnetic shielding.

Assembling the power source device 72 is done by placing the upper housing 77 on the base 76 so as to cover components to be accommodated therein such as the electric circuit components. When this occurs, the electric circuit components provided on the base 76 are required to be connected to the indicator 78 and the sensor 80 provided on the upper housing 77 via wiring before the upper housing 77 is completely placed on the base 76. To this end, for example, electric wires have to be made sufficiently long to complete the connection of the components before the upper housing 77 is placed on the base 76, or the connection has to manually be completed within the upper housing 77 which is being placed on the base 76. However, the longer electric wires cause a problem that the wires get entangled with the components and that the position of the wires changes within the housing 75. Additionally, with the method in which the electric wires are made short for connection at an intermediate position, not only it is difficult to connect the wires to each other but also there may be a risk that the wires become disconnected due to a load that would be applied thereto unless the upper housing is handled carefully. With both methods, the assembling operation has to be carried out carefully, and this makes assembling the power source device 72 very troublesome, decreasing the production efficiency (decreasing the productivity) of the chargers 71.

SUMMARY OF THE INVENTION

The present invention is made to solve the aforesaid problems, and an object thereof is to provide a charger for a vehicle which can facilitate the assembling work of a power source unit by reducing labor hours in assembling an outer casing even if a construction is adopted in which an electric member is mounted on the outer casing of the charger and hence which can increase the production efficiency of chargers.

With a view to attaining the above object, according to the present invention, there is provided a charger for a vehicle, comprising a power source unit and a feeding coupler connected to the power source unit and adapted to be coupled to a receiver of a vehicle. The power source unit comprises an outer casing including a metallic base having an electric circuit component mounted thereon and a metallic tubular member having a closed end and placed or fitted on the metallic base so as to cover the electric circuit component, an electric member mounted on the tubular member in an electromagnetically shielded state, the tubular member having an opening for connecting wires between the electric member and the electric circuit component through the opening, and an electromagnetically shielding material covering the opening.

According to this structure, the electric wires of the electric member and the electric circuit component can be connected to each other through the opening in the tubular member after the tubular member is placed on the base so that the electric component is covered. Consequently, the assembling work of the power source unit can be facilitated. In addition, since the opening is covered by the electromagnetically shielding material, the components accommodated in the power supply unit can be electromagnetically shielded by the outer casing comprising the metallic base and the tubular member.

Preferably, the electric member is mounted on the tubular member such that the electric member is at least partially exposed at an external surface of the tubular member.

In this structure, in a case where the electric member needs to be mounted in such a manner as to be partially exposed from the external surface of the tubular unit or needs to be mounted on the outside of the tubular unit, although there is no way but to assembly the electric member to the tubular member side, the assembling work of the power source unit can be facilitated.

Preferably, a bulge portion is formed integrally with the tubular member in which the electric member is accommodated in such a manner as to be partially exposed from the external surface of the tubular member, and the opening is formed in the bulge portion.

In this structure, in assembling the electric member in such a manner that the electric member is accommodated in the bulge portion of the tubular member, since there is provided the opening, the assembling of the electric member and connection of the electric wires can be facilitated, and moreover, since the electric member is accommodated in the bulge portion, both the electric member and wiring can be disposed within the tubular member in the electromagnetically shielded state. Due to this, no separate electromagnetically shielding construction has to be adopted individually for the electric apparatus and wiring.

Preferably, the electric member is mounted on the outside of the tubular member in an electromagnetically shielded state.

In this structure, although the electric member is mounted on the outside of the tubular member, since it is electromagnetically shielded, the leakage of electromagnetic waves can be prevented.

Preferably, the wires includes an electrically shielded wiring extending from the outside of the tubular member and connected to the electric member.

In this construction, since the wiring extending from the outside of the tubular member for connection to the electric member is the electrically shielded wiring, the wiring does not constitute a source from which electromagnetic waves are irradiated, whereby the leakage of electromagnetic waves can be prevented.

Preferably, the electromagnetically shielding material comprises a metallic housing cover mounted on the tubular member in such a manner as to cover the electric member and the wiring exposed from the external surface of the tubular member or is located on the outside of the tubular member, and the opening.

In this construction, the electric member and the wiring exposed from the external surface of the tubular member or the electric member, and the opening which are located on the outside of the tubular member are covered by and electromagnetically shielded by the metallic housing cover mounted on the tubular member, and also covering the power source unit with the housing cover can provide a better external appearance to the power source main body.

According to another aspect of the present invention, there is provided a charger, for a vehicle, comprising a power source unit and a feeding coupler connected to the power source unit and adapted to be coupled to a receiver of a vehicle, the power source unit comprising an outer casing, a metallic base having an electric circuit component mounted thereon and a metallic tubular member having a closed end and placed on the metallic base so as to cover the electric circuit component, and an indicator provided on the metallic base.

In this structure, since the electric member is mounted on the base, even in the event that the electric member and the electric circuit component are connected in advance, the wiring does not interrupt the placement of the tubular member on the base for the purpose of covering the electric component, facilitating the assembly work of the power source unit. In addition, the components accommodated in the power source unit can be electromagnetically shielded by the outer casing comprising the metallic base and the tubular member.

Preferably, the electric apparatus is an indicator, and/or a sensor for detecting the insertion or removal of the feeding coupler into or from a coupler resting portion where the feeding coupler is removably inserted which is mounted on the outside of the tubular member.

In this construction, even in the event that the indicator or the sensor is mounted on the tubular unit, the assembly work of the power source unit can be facilitated.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Referring to FIGS. 1 to 5, an embodiment of the present invention will be described below in which the invention is embodied as an electromagnetic induction non-contact type battery charger for a vehicle.

Figure 5:
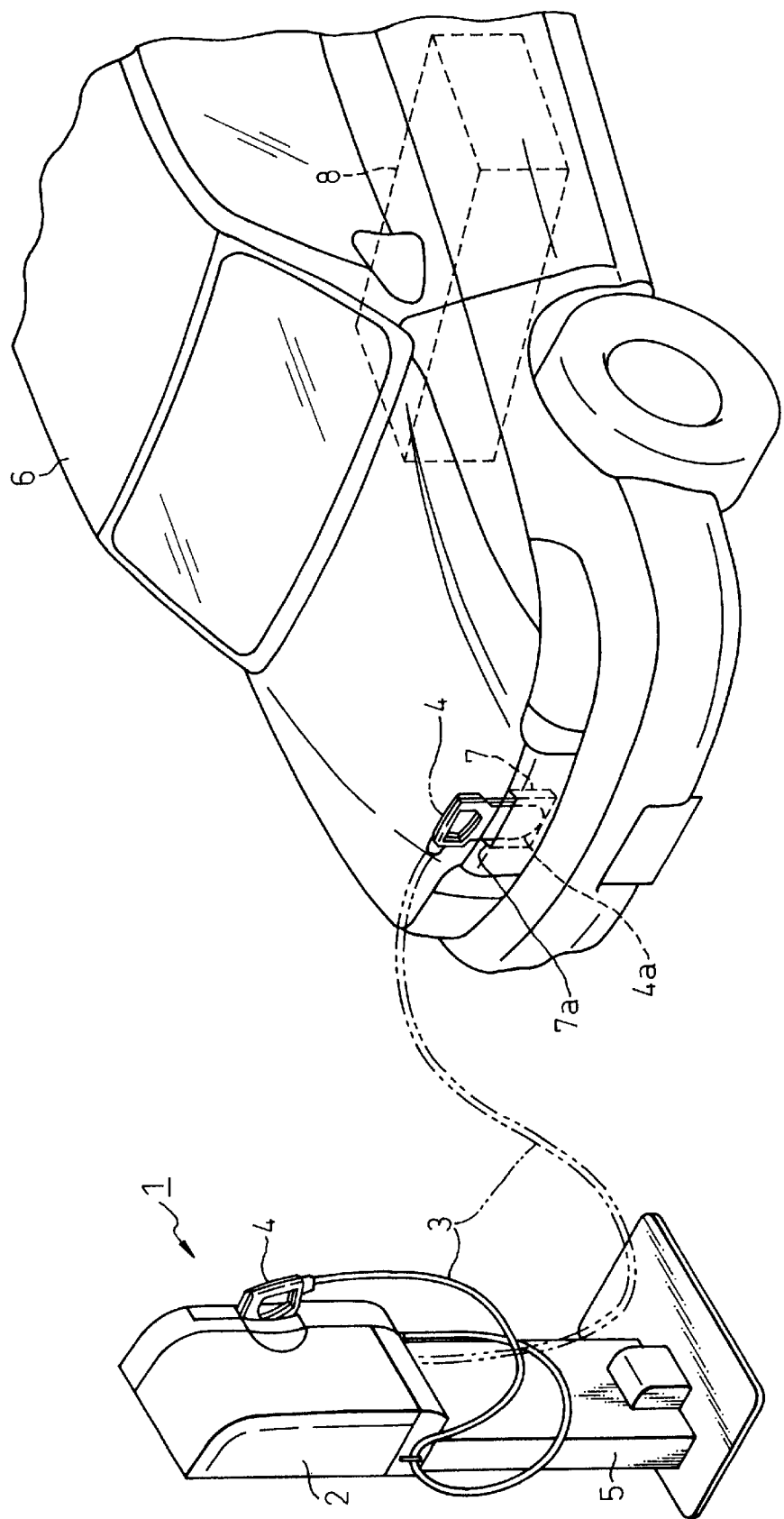
FIG. 5 is a perspective view of the electromagnetic induction non-contact type charger battery charger and a vehicle.

As shown in FIG. 5, the electromagnetic induction non-contact type battery charger (hereinafter, referred to as a charger) 1 comprises a power source device (a power supply device) 2 as a power source unit and a paddle-type (flat shaped) feeding coupler 4 provided at a distal end of a cable 3 extending from the power source device 2. The power source device 2 is supported by a stand 5 arranged upright on the ground.

The feeding coupler 4 has an inserting portion 4a adapted to be removably inserted into a coupler inserting opening 7a of a receiving charge port (a receiving coupler) 7 as a receiver arranged at a selected position (for example, at a front portion of a bonnet) of an electric automobile 6 as a vehicle.

In charging the electric automobile 6, the inserting portion 4a of the feeding coupler 4 is inserted into the coupler inserting opening 7a of the charge port 7, as indicated by chain lines in FIG. 5. When the feeding coupler 4 is connected to the charge port 7, communication is established between them, and the power source device 2 sets a preferred charging condition based on information obtained from the electric automobile 6 on the residual capacity of a battery, converts a commercial alternating current into a charging alternating current (a predetermined voltage, a predetermined frequency) and outputs the alternating current so converted to the feeding coupler 4. The alternating current is supplied from the power source device 2 to the battery 8, while the alternating current is transmitted from a primary coil in the feeding coupler 4 a secondary coil in the charge port 7 under the action of electromagnetic induction, whereby the battery 8 on the electric automobile 6 is charged.

Figure 4:
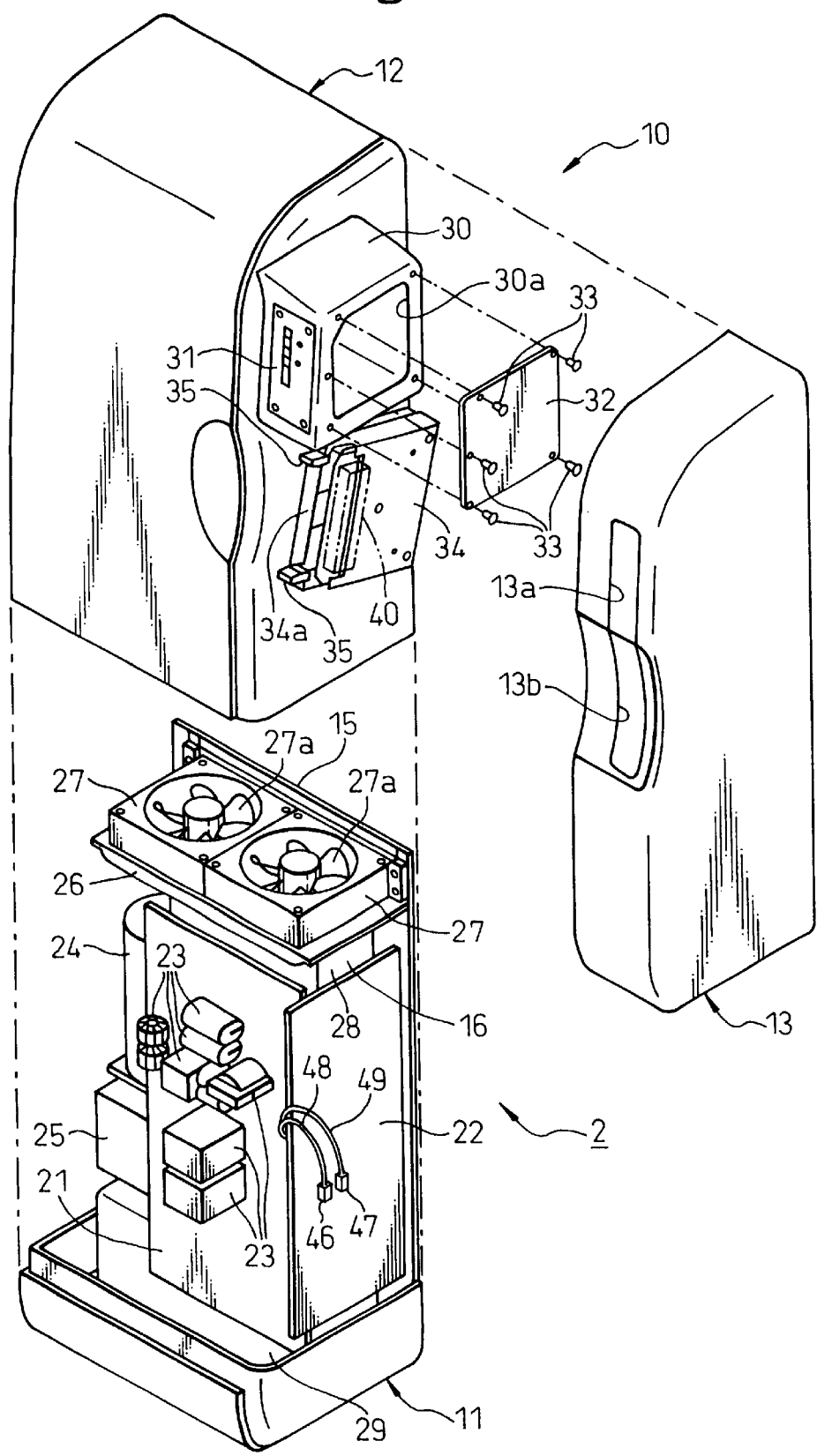
FIG. 4 is an exploded perspective view of the power source unit.

The construction of the power source device 2 will be described. As shown in FIG. 4, a metallic (for example, iron or aluminum) housing 10 as an outer casing constituting the power source device 2 comprises a lower housing 11 as a base supported on the upper surface of the stand 5, a rectangular tubular upper housing 12 with the upper end thereof closed, and a side cover 13, which acts as an electromagnetic shielding material and a housing cover covering the right-hand side of the upper housing 12.

A rectangular tubular duct 16 is attached to the front side of a back board 15, which is welded to and integral with the lower housing 11, and a power system circuit board 21 and a control-system circuit board 22 are directly attached to the front side and one side (right-hand side) of the duct 16, respectively. Electric components (electronic components) 23 constituting a power-system circuit such as a rectification circuit, a power factor improving circuit and a resonance converter are installed on the power system circuit board 21. A capacitor 24 and a coil (a resonance coil) 25, which constitute the power-system circuit and are relatively heavy, are supported by the back board 15 and disposed on the power-system circuit board 21 (on the left-hand side thereof). The power-system circuit is designed to rectify an alternating current supplied from an external commercial alternating current power source and convert the convert obtained direct current into a charging alternating current of, for example, several tens of kHz in order to output it to the cable 3 (FIG. 5). Note that the electric circuit components are constituted by the circuit boards 21 and 22, the capacitor 24, the coil 25 and others.

In addition, electronic components (including a CPU)(not shown) constituting various control circuits for governing the control of the power-system circuit and the control of communication of a communication device (for example, an infrared communication device or a radio communication device) built in the feeding coupler 4 are installed on the control-system circuit board 22. The control circuits include an indication control circuit and a communication power source control circuit for switching on and off the power source of the communication device.

As shown in FIG. 4, the duct 16 has at the top thereof an approximately rectangular tubular hood 26 the size of which increases toward its top, and a pair of left and right blowers (fan units) 27 are disposed in the upper opening portion of the hood 26. The blowers 27 are secured by the back board 15 with screws. The blowers 27 are driven when a temperature detected by a temperature sensor (not shown) for detecting the temperature in the housing 10 reaches or exceeds a set temperature. The blowers 27 are designed to generate a flow of cooling air in the housing 10, by forcibly introducing cooling air from above the duct 16.

The duct 16 is constructed by an angled, cooling fin plate 28 having inner fins and formed into a duct, and the circuit boards 21 and, 22 are directly attached to the cooling fin plate 28. The duct 16 is covered by a box-like cover 29 at the lower part of the cooling fin plate 28, so that the duct 16 communicates with an exhaust port (not shown) provided in the bottom of the lower housing 11. An intake port (not shown) is formed in the bottom of the lower housing 11 at a position in front of the exhaust port, and when the blower devices 27 are driven, a flow of air is generated wherein an external air is taken into the housing 10 through the intake port, passes upwardly along front sides of the circuit boards 21 and 22, and through the fans 27 into the duct 16, and is then discharged from the exhaust port.

As shown in FIGS. 1 to 4, a box portion 30 is integrally formed with the right-hand side surface of the upper housing 12 as a bulge portion, and an indicator 31 as an electric component is incorporated in the front surface of the box portion 30. The indicator 31 indicates a residual capacity (a charged condition) of the battery obtained from the electric automobile 6 as a result of communication. An opening 30a is formed in the right-hand side surface of the box portion 30. The opening 30a is closed by a metallic cover 32 as an electromagnetically shielding material, the cover being fixed to the box portion 30 with screws.

Also, a coupler resting case 34 is disposed on the right-hand side surface of the upper housing 12 below the box portion 30 in an inserted coupler securely receiving case 34, as a coupler inserting and removing portion where the feeding coupler 4 is removably inserted. A coupler inserting opening 34a is disposed in the front side of the coupler resting case 34 for insertion of the feeding coupler 4 therein, and a pair of locking springs 35 are disposed at upper and lower positions of the coupler inserting opening 34a. The feeding coupler 4 is lightly locked with the pair of locking springs 35 in a state in which the feeding coupler 4 is fully inserted in the coupler inserting opening 34a so that the coupler 4 does not fall down from the coupler resting case 34.

Figure 1:
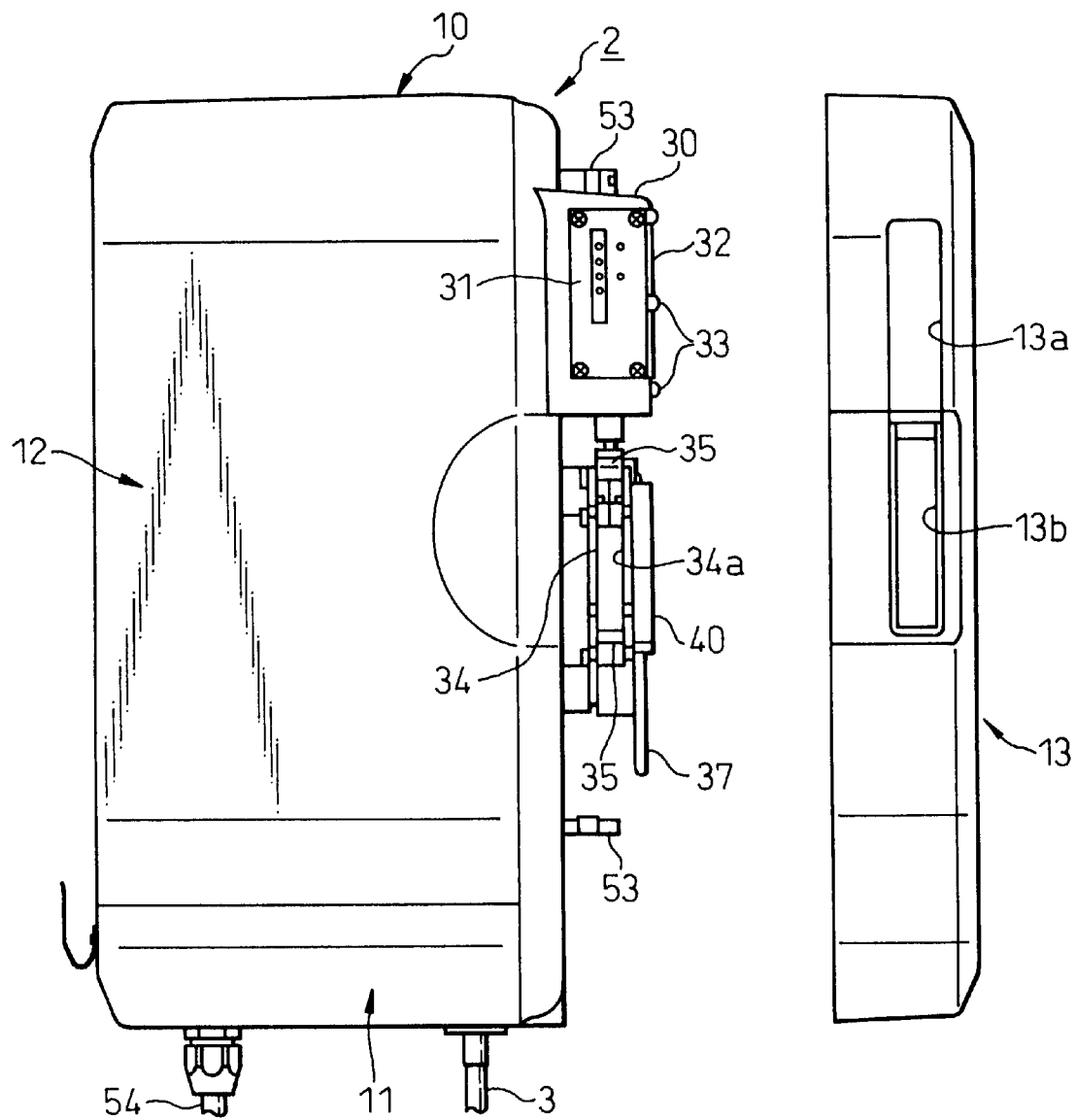
FIG. 1 is a partially exploded front view of a power source unit constituting an electromagnetic induction non-contact type battery charger according to an embodiment of the present invention.

In addition, as shown in FIGS. 1 and 4, openings 13a and 13b are formed in the side cover 13 for allowing the indicator 31 and the coupler inserting opening 34a of the coupler resting case 34 to be exposed from the front side of the housing 10.

Figure 2:
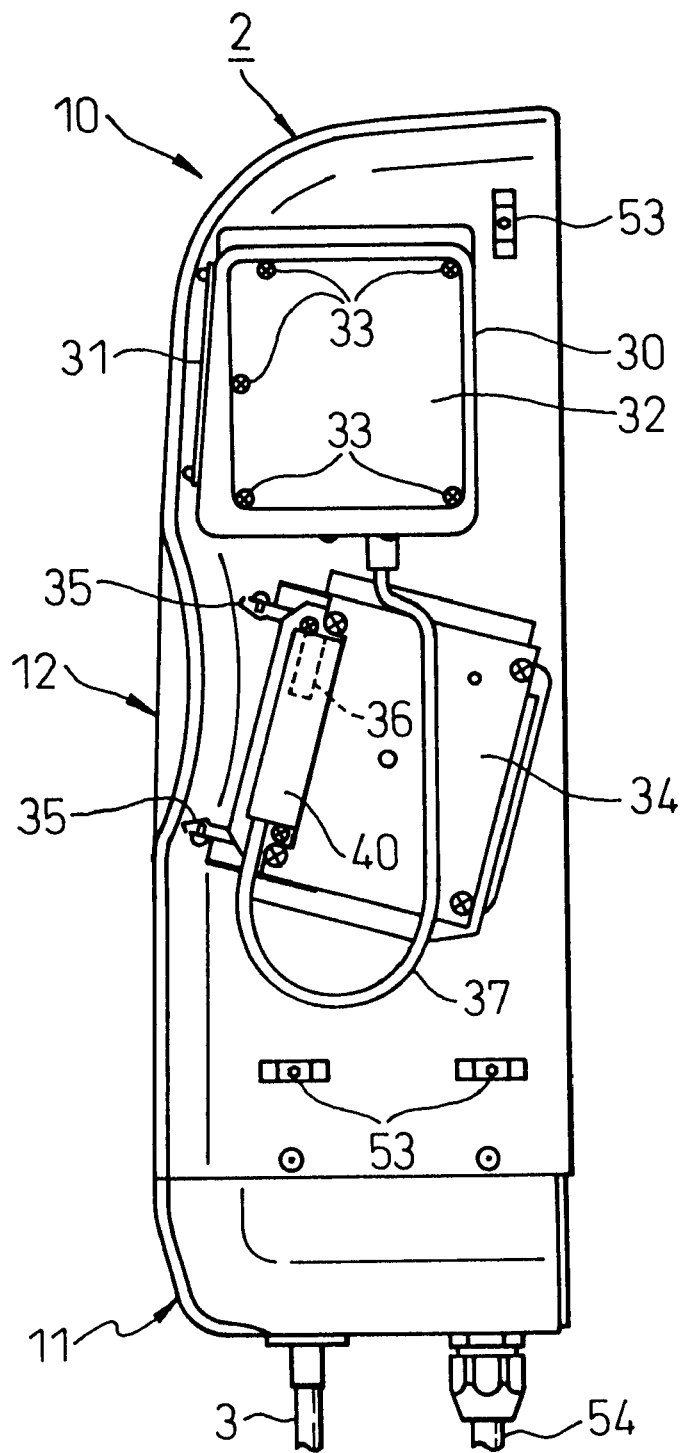
FIG. 2 is a side view of the power source unit, with the side cover removed.
Figure 3:
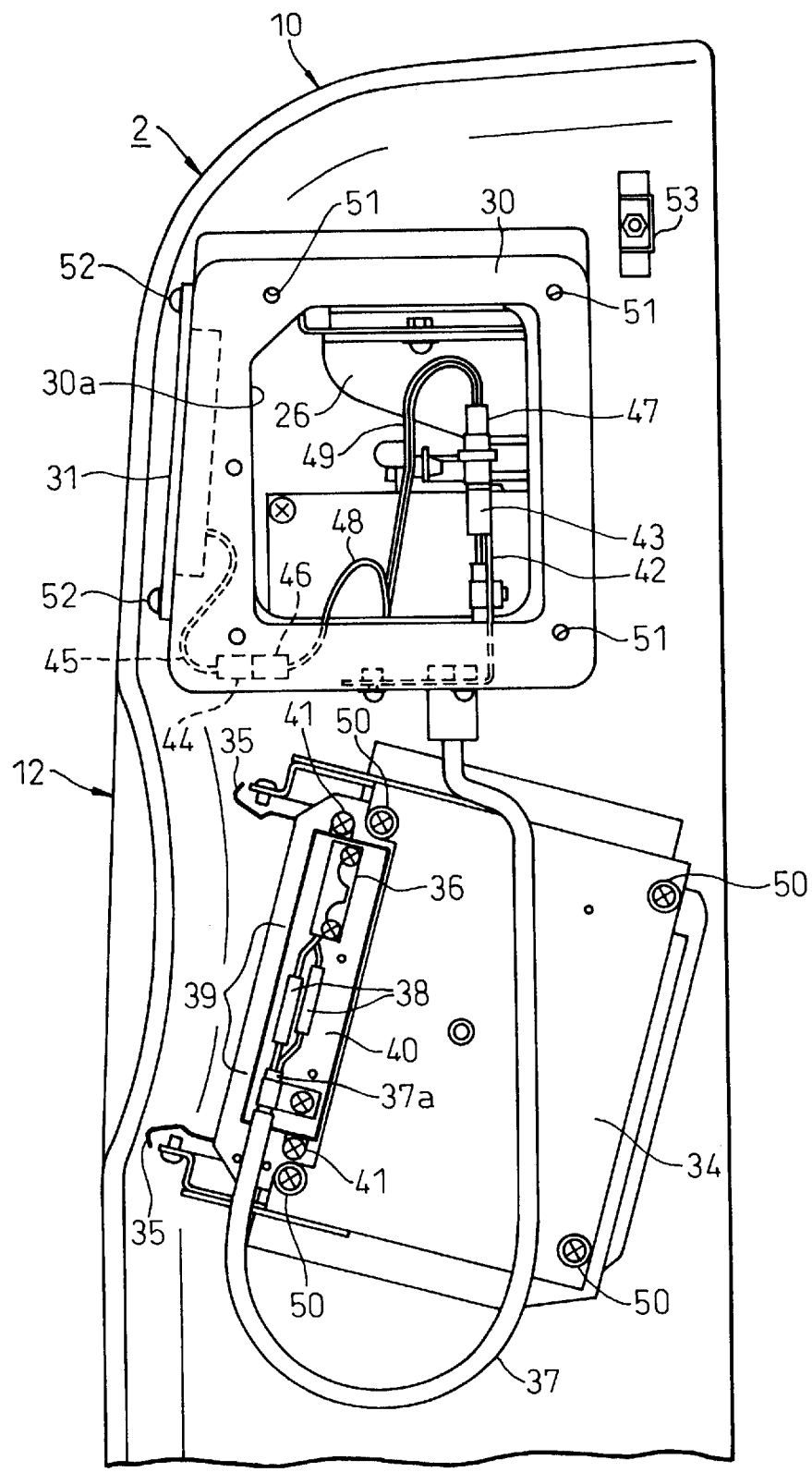
FIG. 3 is an enlarged side view of the power source unit of FIG. 2.

Also, as shown in FIGS. 2 and 3, a sensor (for example, a magnetic sensor) 36 as an electric member and a detector for detecting that the feeding coupler 4 is fully inserted in the coupler inserting opening 34a are mounted on the coupler resting case 34. A magnet (not shown) is embedded in the feeding coupler 4 at a predetermined position, and the sensor 36 is arranged to detect magnetism of the magnet when the feeding coupler 4 is fully inserted in the coupler inserting opening 34a.

An electromagnetically shielded wire 37 extends outward from the box portion 30 as wiring for electrically connecting the circuit board 22 in the housing 10 to the sensor 36, since the sensor 36 is mounted on the outside of the upper housing 12. The electromagnetically shielded wire 37 has therein a shielding layer 37a comprising, for example, an aluminum wire. A wiring portion (non-electromagnetically shielded wire portion) 39 connecting the sensor 36 with wires (bare wires) of the electromagnetically shielded wire 37 via terminals 38 and the sensor 36 are disposed in an aluminum case 40, and the aluminum case 40 is fixed to the side surface of the coupler resting case 34 with screws 41. Thus, the sensor 36 is mounted on the outside of the upper housing 12. Note that the aluminum case 40 is illustrated in section.

As shown in FIG. 3, the other end of the electromagnetically shielded wire 37 is connected to a connector 43 supported by a bracket 42 within the box portion 30. In addition, within the interior of the box portion 30, wiring 45 having a connector 44 provided at the distal end thereof extends from the back side of the indicator 31.

On the other hand, as shown in FIG. 4, two wires 48 and 49 having connectors 46 and 47 provided at the distal ends thereof extend from the circuit board 22. The connector 46 is electrically connected to the indication control circuit, whereas the connector 47 is electrically connected to the input part of the communication power source control circuit. The connectors 46 and 47 are connected to the connectors 44 and 43, respectively, whereby the circuit board 22 and respective wires 45, 48, 37 and 49 of the indicator 31 and the sensor 36 are connected to each other.

As shown in FIG. 3, the coupler resting case 34 is fixed to the right-hand side surface of the upper housing 12 with screws 50, and a plurality of screw holes 51 are formed in the periphery of the opening 30a in the box portion 30 so that screws 33 are securely screwed thereinto. The indicator 31 is secured to the front surface of the box portion 30a with screws 52. Additionally, as shown in FIGS. 1 to 3, seat portions 53 into which screws for fixing the side cover 13 to the upper housing 12 are securely screwed are welded to the right-hand side surface of the upper hosing 12. The upper housing 12 is constructed so as to be fixed to the lower housing 11 by securely screwing screws into the back board 15 in a state in which the upper housing 12 is placed on the lower housing 11. In addition, as shown in FIGS. 1 and 2, the cable 3 is connected to the bottom of the lower housing 11 at a position closer to the right-hand side thereof and a power source cable 54 is connected to the same bottom at a position closer to the left-hand side thereof for supplying a commercial alternating current.

The assembling procedure of the charger 1 will now be described.

The indicator 31, the sensor 36 and the electromagnetically shielded wire 37 are assembled to the upper housing 12 in advance. The upper housing 12 is assembled to the lower housing 11 after all the components that are to be assembled to the lower housing 11 have been so assembled. In this instance, the connectors 46 and 47 are provisionally fixed at positions facing to or close to the opening 30a with clips.

As shown in FIG. 4, the upper housing 12 is placed or fitted on the lower housing 11 in such a manner as to cover the circuit boards 21 and 22 and the blower devices 27 that are assembled to and supported by the back board 15. Thereafter, as shown in FIG. 3, the respective connectors 46, 47, 43 and 44 are connected to each other through the opening 30a to connect the respective wires 48, 49, 45 and 37. After the connecting work has been completed, as shown in FIG. 4, the cover 32 is fixed to the box portion 30 with the screws 33 so as to close the opening 30a. Thereafter, the upper housing 12 and the lower housing 11 are fixed to each other by securely screwing screws into the back board 15 from the outside of the back of the upper housing 12. Then, when the assembly in the state shown in FIGS. 1 and 2 has been completed, the side cover 13 is next disposed to cover the entirety of the right-hand side surface of the upper housing 12, and the side cover 13 is fixed to the upper housing 12 by securely screwing the screws inserted from the outside of the side cover 13 into the seat portion 53.

Since the opening 30a through which the connecting work of the wires 45, 48, 37 and 49 for the indicator 31 and the sensor 36 is carried out is formed in the box portion 30, the connecting work can be carried out after the upper housing 12 has been placed on the lower housing 11. Since this allows the placement of the upper housing 12 on the lower housing 11 to be carried out without regard to the wires 45, 48, 37 and 49, the working efficiency can be improved.

In addition, since the opening 30a is electromagnetically shielded by being closed by the metallic cover 32, electromagnetic waves emitted from the circuit boards 21 and 22 and the various electric components 24 and 25 can completely be shielded. Additionally, since the electromagnetically shielded wire 37 is used for the extension line for the sensor 36 mounted on the outside of the housing 10 and moreover the sensor 36 and the wiring portion 39 are protected within the aluminum case 40, there is no risk of electromagnetic waves leaking from the extension line 37 and the sensor 36. Furthermore, since the entirety of the right-hand side surface of the upper housing 12 is covered with the metallic side cover 13 in such a manner as to completely cover the box portion 30, the coupler resting portion 34 and the like, double electromagnetic shielding is provided by the side cover 13.

As has been described in detail heretofore, according to the embodiment of the present invention, the following advantages can be obtained.

(1) The wires 45, 48, 37 and 49 connecting the indicator 31 and the sensor 36 to the circuit board 22 can be connected together through the opening 30a after the upper housing 12 is placed on the lower housing 11 to cover the circuit boards 21 and 22. Thus, the assembling work of the power source device 2 can be facilitated.

(2) Since the indicator 31 and the wires 45 and 48 thereof are located within the box portion 30 closed by the cover 32 and are accommodated within the housing 10 in an electromagnetically shielded state, there is no need to adopt individually separate electromagnetically shielding constructions for the indicator 31 and the wires 45 and 48 thereof.

(3) Since the extension line taken out to the outside of the upper housing 12 for connection to the sensor 36 is the electromagnetically shielded wire 37, the leakage of electromagnetic waves from the extension line 37 can be prevented. Additionally, since the sensor 36 and the wiring portion 39 therefor are protected within the aluminum case 40, electromagnetic waves leaking from the sensor 36 and the wiring portion 39 are prevented from leaking to the outside of the aluminum case 40. Consequently, even if a construction is adopted in which the sensor 36 is mounted on the outside of the housing 10, good electromagnetic shielding properties can be secured.

(4) Since the circuit board 22 is located at a position closer to the opening 30a in the housing 10, the length of the wires 48 and 49 can be made relatively short.

(5) Since the metallic cover 13 is mounted on the upper housing to cover the entirety of the right-hand side surface of the upper housing, not only can double electromagnetic shielding be provided so as to improve the electromagnetically shielding effect but also the box portion 30, the coupler resting case 34, the wiring 37 and the like can be concealed to thereby improve the external appearance of the power source device 2.

Figure 6:
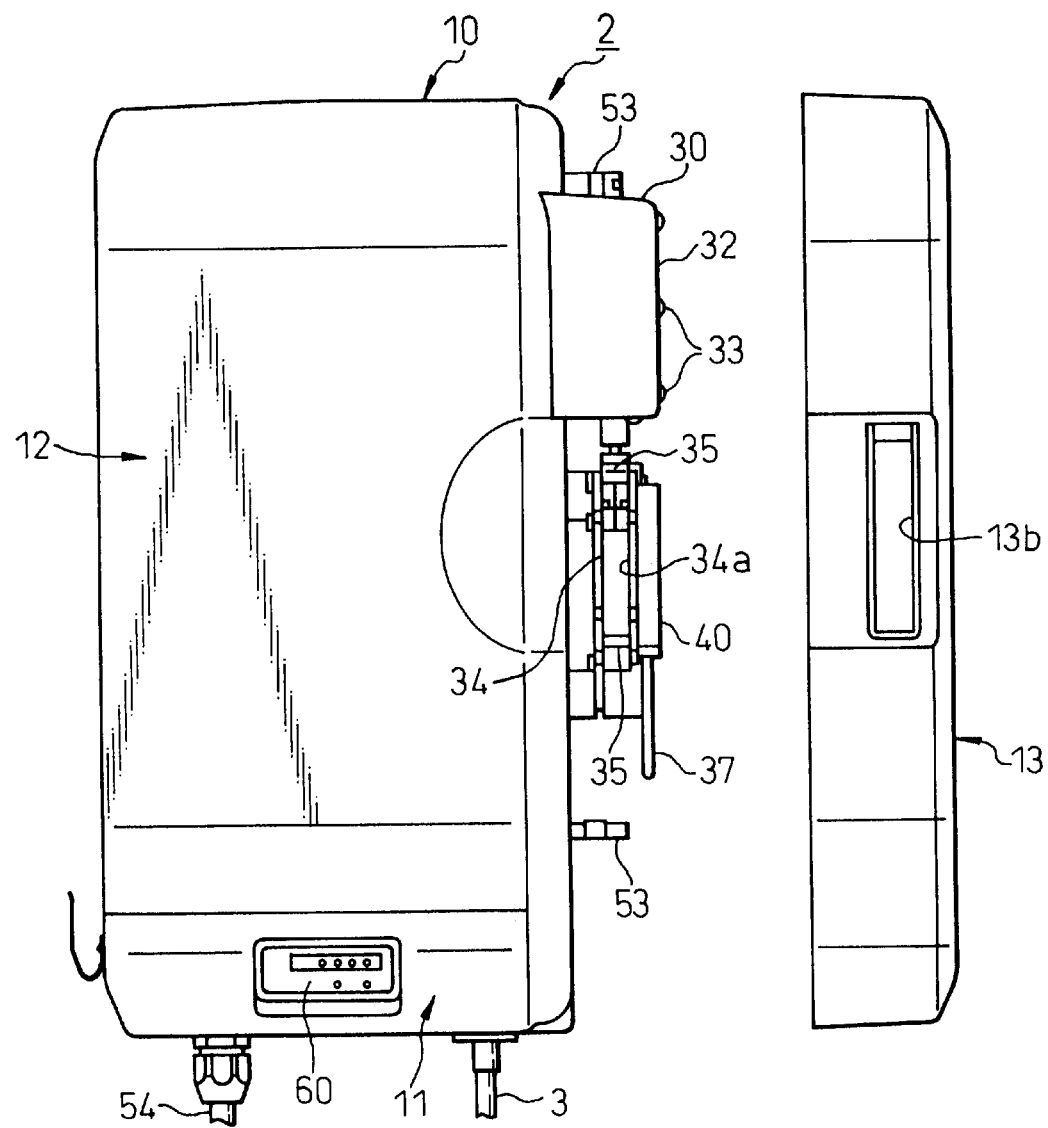
FIG. 6 is a partially exploded front view of a power source unit according to another embodiment of the present invention.
Figure 7:
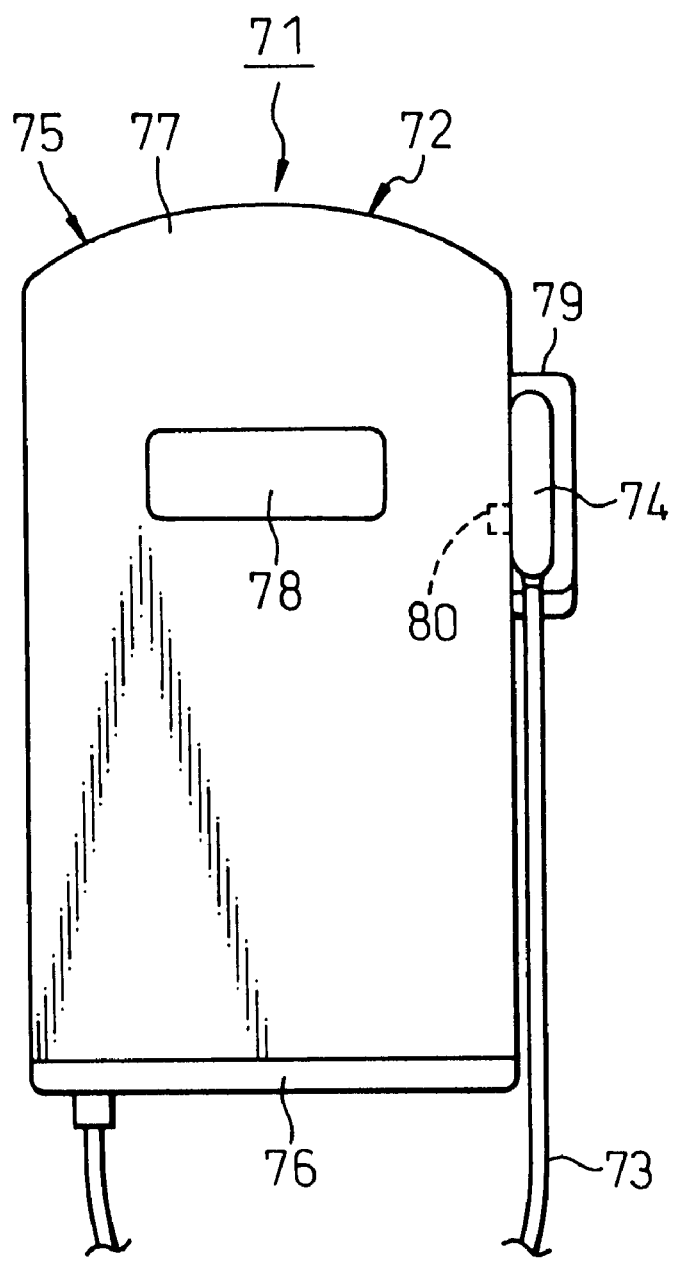
FIG. 7 is a front view showing a conventional charger.

Note that the present invention is not limited to the embodiment described above but may be modified as follows, for example:

FIG. 6 shows a charger 1 wherein an indicator 60 as an electric member is mounted on a lower housing 11 as a base. The construction of the charger 1 is identical to that of the previous embodiment except for the mounting position of the indicator 60. An opening 30a in a box portion 30 is used for connection of wires for a sensor 36. The indicator 60 is mounted on the lower housing 11 in a posture in which an indicating surface of the indicator 60 is oriented obliquely upwardly. According to this construction, since the indicator 60 is mounted on the lower housing 11, even if the indicator 60 and a circuit board 22 (see FIG. 4) are connected to each other in advance, the wiring for the indicator and the circuit board does not interrupt the assembly of a power source device 2, whereby the assembling work thereof can be facilitated.

The electric member which is mounted on the housing 11 is not limited to the indicator and the detector. For example, the electric member may be a speaker, an illuminating lamp or a power rate meter.

The use of the indicator does not have to be limited to indicate the residual capacity (the charged condition) of the battery, and therefore the indicator may be used to indicate other information (for example, charging rate, diagnostic information obtained from an electric automobile through communication therewith, or the like).

The use of the detector does not have to be limited to detect the insertion and/or removal of the feeding coupler into and/or from the coupler resting case, and therefore, the detector may be a sensor for performing another sensing or detecting function or a switch.

There may be provided no detector in the construction of the previous embodiment. Namely, the communication power source may be left switched on at all times. Even in such an embodiment, the construction of the indicator 31 (60) described in the previous embodiment or in FIG. 6 may be adopted for an indicator according to the embodiment, whereby the assembling work of a power source device 2 can be facilitated.

In the previous embodiment, the sensor 36 can be mounted on the upper housing 12 in such a manner that only a detecting portion thereof is exposed from the side surface of the upper housing 12. In this case, since the extension line is not needed, a special electric wire such as the electromagnetically shielded wire does not have to be used.

In addition, the side cover 13 may be deleted. Namely, the opening is closed with only the cover 32 as the electromagnetically shielding material. The external appearance may be deteriorated slightly, but the assembling work of the power source device 2 can be further facilitated.

The mounting position of the electric apparatus to the upper housing is not limited to the side surface of the upper housing. For example, the electric apparatus may be mounted on the front surface of the upper housing. In addition, a plurality of electric members may be mounted on different surfaces of the upper housing (for example, left-hand side and right-hand side surfaces, the side surface and the front surface, or the like).

The cover 32 for closing the opening 30a may be deleted. Namely, only the side cover 13 (the housing cover) may be used to provide electromagnetic shielding. Devising the configuration of the side cover 13 may be able to modify the gap between the upper housing 12 and the side cover 13 or the gap at the coupler pass-through opening 34a to a gap configuration (gaps at bending paths) or a space that can be electromagnetically shielded, whereby the electromagnetic shielding can be provided by the side cover 13 only. It goes without saying that a metallic member or the like may be mounted over the gap to improve the electromagnetically shielding effect.

The material of the cover 32 is not limited to metal. For example, ferrite (sintered ferrite or ferrite resin) may be used as a material for the cover. In short, any material having electromagnetic shielding properties may be used as a material for the cover. For example, a metallic-coated or ferrite-coated resin plate may be used.

The tubular unit having one closed end may be constituted by a plurality of members, not by a single member such as the upper housing. For example, the tubular unit may be constituted by two members such as a tubular member and a bottomed tubular member. In addition, the tubular unit may be constituted by two members such as a front board and a back board. It goes without saying that the bottomed tubular unit may be constituted by a plurality of members such as three or more members. In short, any member formed into a housing portion that can cover the electric circuit components assembled to and supported by the base may be used as a member for the bottomed tubular unit.

The mode for connecting the feeding coupler constituting the charger to the receiver of the automobile is not limited to insertion. In short, any connecting construction may be used in which the primary coil and the secondary coil can be disposed close to each other so that an electromagnetic induction can be ensured.

The present invention is not limited to the charger of the electromagnetic induction system (the inductive system). The present invention may also be applied to a charger of the conductive system.

The present invention is not limited to electric automobiles but the present invention may be applied to any type of automobiles using a battery. For example, the present invention may be applied to an industrial vehicle such as a battery-type forklift truck or a battery-type carrier.

Note that a technical concept derived from the previous embodiment but not claimed will be described below.

The electromagnetically shielding material is constituted by the housing cover and the cover closing the opening within the housing cover. In this case, since the opening is double electromagnetically shielded, the leakage of electromagnetic waves can be prevented more securely.

According to the present invention, since the wires of the electric members and the electric circuit components can be connected to each other after the bottomed tubular unit is placed on the base so as to cover the electric circuit components, the assembling work of the power source device can be facilitated.

Since both the electric member and the wiring therefor are accommodated in the bulge portion of the bottomed tubular unit, there is no need to adopt separate electromagnetic shielding construction individually for the electric components and the wiring.

In addition to the effects provided previously, since the extension line taken out to the outside of the bottomed tubular unit for connection with the electric member is the electromagnetically shielded wire, the leakage of electromagnetic waves can be prevented.

The electric member and the wiring exposed from the external surface of the bottomed tubular unit or located on the outside thereof, and the opening are covered with the metallic housing cover for electromagnetic shielding, and the external appearance of the power source main body can be improved.

Since the electric member is mounted on the base, even if the electric member and the electric circuit component are connected to each other in advance, the wiring interrupts the assembly work of the power source unit, whereby the assembling work of the power source unit can be facilitated.

What is claimed is:

1. A charger for a vehicle, comprising a power source unit and a feeding coupler connected to the power source unit via a cable and adapted to be coupled to a receiver of a vehicle, said power source unit comprising:

an outer casing including a metallic base having an electric circuit component mounted thereon and a metallic tubular member having a closed end and placed on said metallic base so as to cover said electric circuit component;

an electric member mounted on said tubular member in an electromagnetically shielded state;

said tubular member having an opening for connecting wires between said electric member and said electric circuit component through said opening; and an electromagnetically shielding material covering said opening.

2. A charger as set forth in claim 1, wherein said electric member is mounted on said tubular member such that said electric member is at least partially exposed from an external surface of said tubular member.

3. A charger as set forth in claim 1, wherein said tubular member has a bulge portion integrally formed with said tubular member in which said electric member is accommodated in such a manner as to be partially exposed from the external surface of said tubular member, said opening being formed in said bulge portion.

4. A charger as set forth in claim 1, wherein said electric member is mounted on the outside of said tubular member in an electromagnetically shielded state.

5. A charger as set forth in claim 4, wherein said wires include electrically shielded wiring extending to the outside of said tubular member and connected to said electric member.

6. A charger as set forth in claim 1, wherein said electromagnetically shielding material comprises a metallic housing cover mounted on said tubular member in a such a manner as to cover said electric member and said wiring exposed from the external surface of said tubular member, or is located on the outside of said tubular member, and said opening.

7. A charger as set forth in claim 1, wherein said electric member is an indicator.

8. A charger as set forth in claim 1, wherein said electric member is a detector for detecting insertion or removal of said feeding coupler into or from a coupler rest portion provided on the outside of said tubular member.

9. A charger for a vehicle, comprising a power source unit, and a feeding coupler connected to said power source unit via a cable and adapted to be coupled to a receiver of a vehicle, said power source unit comprising:

an outer casing including a metallic base having an electric circuit component mounted thereon, and a metallic tubular member having a closed end and placed on said metallic base so as to cover said electric circuit component; and an electric member provided on said metallic base.

10. A charger as set forth in claim 9, wherein said electric member is an indicator.

11. A charger as set forth in claim 9, wherein said electric member is a detector for detecting insertion or removal of said feeding coupler into or from a coupler rest portion provided on the outside of said tubular member.

* * * * *